(12) United States Patent
Shouji

(10) Patent No.: US 9,467,554 B2
(45) Date of Patent: *Oct. 11, 2016

(54) MOBILE PHONE TERMINAL

(71) Applicant: NEC CORPORATION, Tokyo (JP)

(72) Inventor: Daisuke Shouji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/573,369

(22) Filed: Dec. 17, 2014

(65) Prior Publication Data
US 2015/0105126 A1   Apr. 16, 2015

Related U.S. Application Data

(63) Continuation of application No. 14/278,870, filed on May 15, 2014, which is a continuation of application No. 13/530,482, filed on Jun. 22, 2012, now Pat. No. 8,996,058, which is a continuation of application No. 12/738,871, filed as application No. PCT/JP2008/073671 on Dec. 18, 2008, now Pat. No. 8,229,496.

(30) Foreign Application Priority Data

Dec. 27, 2007  (JP) ................... 2007-335987

(51) Int. Cl.
H04M 1/00       (2006.01)
H04M 1/725      (2006.01)
(Continued)

(52) U.S. Cl.
CPC ....... *H04M 1/72569* (2013.01); *H04M 1/0266* (2013.01); *H04M 1/72519* (2013.01); *H04M 1/72577* (2013.01); *H04W 88/02* (2013.01); *H04M 1/67* (2013.01); *H04M 2201/38* (2013.01);
(Continued)

(58) Field of Classification Search
CPC .................. H04M 1/72519; H04W 52/02
USPC ........ 455/566, 90.2, 556.1, 572, 90.3, 575.1
See application file for complete search history.

(56) References Cited

U.S. PATENT DOCUMENTS 7,231,231 B2   6/2007  Kokko et al.
7,522,065 B2   4/2009  Falcon ................. 340/686.6
(Continued)

FOREIGN PATENT DOCUMENTS

EP   1755322 A2   2/2007
JP   10-65598     3/1998
(Continued)

OTHER PUBLICATIONS

Japanese Office Action for JP Application No. 2014-224599 mailed on Aug. 4, 2015 with English Translation.
(Continued)

*Primary Examiner* — Temica M Beamer

(57) ABSTRACT

Disclosed is an information communication terminal having a configuration in which it is possible to prevent a wrong operation of the information communication terminal due to an unconscious operation of an input equipment during operating an audio output equipment. That is, the information communication terminal includes a controller. The controller operates a detection sensor that detects an object approaching during operating the audio output equipment. And the controller controls a status of being input into the input equipment based on a detected result of the detection sensor.

8 Claims, 8 Drawing Sheets

(51) Int. Cl.
*H04M 1/02* (2006.01)
*H04W 88/02* (2009.01)
*H04M 1/67* (2006.01)

(52) U.S. Cl.
CPC ..... *H04M 2250/12* (2013.01); *H04M 2250/22* (2013.01)

(56) References Cited

U.S. PATENT DOCUMENTS

| | | | |
|---|---|---|---|
| 8,058,969 | B1 | 11/2011 | Lai et al. .................... 340/5.52 |
| 2007/0042816 | A1 | 2/2007 | Chan |
| 2007/0075965 | A1* | 4/2007 | Huppi ............... H04M 1/72563 345/156 |
| 2007/0085157 | A1 | 4/2007 | Fadell et al. |
| 2008/0057926 | A1 | 3/2008 | Forstall et al. ............. 455/415 |
| 2014/0248927 | A1 | 9/2014 | Shouji |

FOREIGN PATENT DOCUMENTS

| | | | |
|---|---|---|---|
| JP | 10-271199 | A | 10/1998 |
| JP | 2000-013478 | A | 1/2000 |
| JP | 2001352395 | A | 12/2001 |
| JP | 2002111801 | A | 4/2002 |
| JP | 2002135369 | A | 5/2002 |
| JP | 2004159028 | A | 6/2004 |
| JP | 2004-532477 | A | 10/2004 |
| JP | 2005-223629 | A | 8/2005 |
| JP | 2005-278043 | A | 10/2005 |
| JP | 2006-050505 | A | 2/2006 |
| JP | 2006-277739 | A | 10/2006 |
| JP | 2007-259134 | A | 10/2007 |
| JP | 2007323257 | A | 12/2007 |
| JP | 2008141688 | A | 6/2008 |
| JP | 2014-068402 | A | 4/2014 |
| JP | 2015-046931 | A | 3/2015 |
| JP | 2015-167415 | A | 9/2015 |
| WO | 2007/066173 | A1 | 6/2007 |
| WO | 2009/084610 | A1 | 7/2009 |

OTHER PUBLICATIONS

International Search Report for PCT/JP2008/073671 mailed Feb. 10, 2009.
Supplementary European Search Report for EP 08 86 8754 completed Dec. 13, 2011.
Japanese Office Action for JP Application No. 2014-224599 mailed on Jan. 26, 2016 with English Translation.
Japanese Office Action for JP Application No. 2014-002335 mailed on Mar. 1, 2016 with English Translation.
Japanese Office Action for JP Application No. 2015-130693 mailed on Mar. 8, 2016 with English Translation.
US Office Action for U.S. Appl. No. 14/278,870 mailed on Oct. 14, 2015.

* cited by examiner

MOBILE PHONE TERMINAL

REFERENCE TO RELATED APPLICATION

This present application is a Continuation Application of Ser. No. 14/278,870 filed on May 15, 2014, which is a Continuation Application of Ser. No. 13/530,482 filed on Jun. 22, 2012, which is a Continuation Application of Ser. No. 12/738,871 filed on Apr. 20, 2010, which is a National Stage Entry of International Application PCT/JP2008/073671 filed on Dec. 18, 2008, which claims the benefit of priority from Japanese Patent Application 2007-335987, filed on Dec. 27, 2007, the disclosures of all of which are incorporated in their entirety by reference herein.

TECHNICAL FIELD

The present invention relates to a mobile phone terminal which includes a touch panel.

BACKGROUND ART

In recent years, a touch panel which is called the flat touch panel and the touch window and is possible to make a mobile telephone thin has been developed. Then, the mobile telephone whose surface the touch panel is mounted on, that is, the mobile telephone with the touch panel is beginning to become prevalent.

In the mobile telephone with the touch panel, since the touch panel is mounted on the surface of the mobile telephone, a part of body such as cheek and ear of user may touch the touch panel during a telephone call in some cases. In this case, though user does not intend to touch the touch panel, the mobile telephone carries out the same operation as one which is carried out at a time when user touches the touch panel consciously. For this reason, the following inconvenience is caused.

For example, due to the unconscious touch with the touch panel as mentioned above, the mobile telephone carries out an operation which user does not intend to do and consequently, the telephone call is disturbed. As one of operation modes of the mobile telephone, there is an input standby mode in which the mobile telephone waits for a next handling of a handling unit (such as touch panel). The input standby mode continues due to the unconscious touch with the touch panel as mentioned above. For example, a backlight of a liquid crystal display which is installed on the mobile telephone is lit in the input standby mode. In the case that the input standby mode continues during the telephone call due to the touch of cheek of user or the like with the touch panel as mentioned above, waste that the backlight of the liquid crystal display continues to be lit though the liquid crystal display is not used in the telephone call is caused. As a result, electric power of battery of the mobile telephone is consumed wastefully and then, remaining capacity of the battery decreases, and consequently, an available time when user can use the mobile telephone decreases substantially. Moreover, if the backlight of the liquid crystal display continues to be in a lighting state during the telephone call, temperature of the mobile telephone rises due to heat which is generated by the backlight. Therefore, warmth which user feels at the near of ear makes user feel uncomfortable.

Patent document 1 proposes the following configuration. That is, the patent document 1 discloses a configuration in which it is judged whether user talks on the mobile telephone while user's ear touches a speaker, on the basis of degree of focusing of a camera which is mounted on the mobile telephone. Moreover, the patent document 1 proposes a configuration in which an input from the touch panel is made ineffective, in the case that it is judged that the mobile telephone is in a telephone call mode according to the above configuration for judgment.

Patent document 1: Japanese Patent Application Laid-Open No. 2004-159028

Patent document 2: Japanese Patent Application Laid-Open No. 2002-135369

Patent document 3: Japanese Patent Application Laid-Open No. 1998-065598

DISCLOSURE OF INVENTION

Technical Problem

However, according to the proposed configuration disclosed in the patent document 1, a problem that it is impossible to handle the camera during the telephone call is caused. In other words, there is a problem that a function which is available during the telephone call is restricted.

Accordingly, an object of the present invention is to provide a mobile phone terminal which can avoid a wrong operation caused by the unconscious touch with the touch panel during the telephone call without restricting the function which is available during the telephone call.

Technical Solution

According to the present invention, a mobile phone terminal includes a touch panel unit for inputting information, a telephone call determining means which judges whether the mobile phone terminal is in a telephone call mode, an approach detecting means which outputs a wave and detects receiving of the wave as approaching of an object, and an input controlling means which carries out a control to make inputted information from the touch panel unit ineffective in the case that the telephone call determining means judges that the mobile phone terminal is in the telephone call mode.

According to the present invention, a method for avoiding an unnecessary handling during the telephone call includes a step in which a wave is outputted and receiving of the wave is detected as approaching of an object to a mobile phone terminal and a step in which an information inputted from the touch panel unit mounted on the mobile phone terminal is made ineffective in the case that approaching of the object to the mobile phone terminal is detected during the telephone call.

Advantageous Effect

According to the present invention, it is possible to avoid the wrong operation of the mobile phone terminal due to the unconscious touch with the touch panel during the telephone call without restricting the function which is available during the telephone call.

EXPLANATION OF REFERENCE 104,304: Touch panel unit
201,401: Telephone call determining means
202,402: Approach detecting means
203,403: Input controlling means

BEST MODE FOR CARRYING OUT THE INVENTION

An exemplary embodiment according to the present invention will be described with reference to a drawing in the following.

Figure 1:
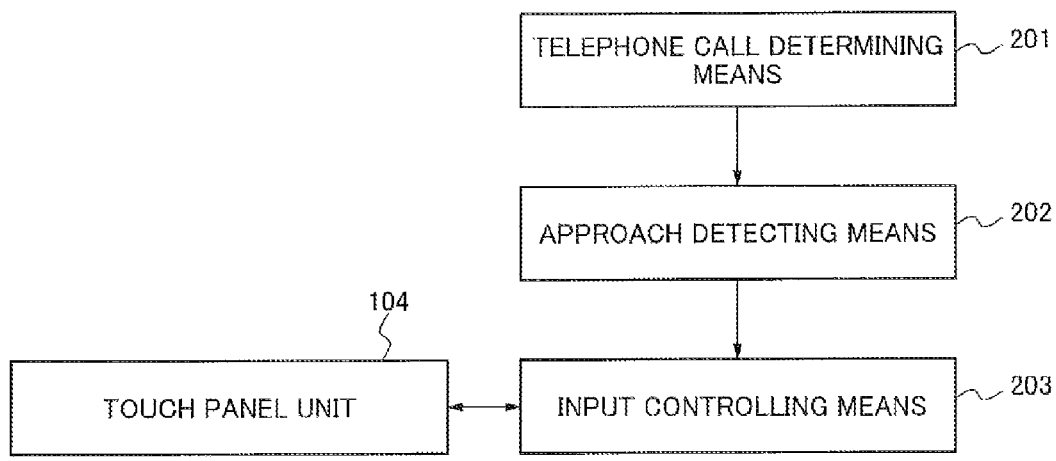
FIG. 1 is a block diagram showing an outline of a configuration of a mobile phone terminal according to a first exemplary embodiment of the present invention.

First, an outline of a first exemplary embodiment will be described with reference to a drawing. FIG. 1 is a functional block diagram showing an example of the minimum configuration of a mobile phone terminal according to the first exemplary embodiment. The mobile phone terminal shown in FIG. 1 includes a touch panel unit 104, a telephone call determining means 201, an approach detecting means 202 and an input controlling means 203.

The touch panel unit 104 is an input means for inputting information.

The telephone call determining means 201 judges whether the mobile phone terminal is in a telephone call mode.

In the case that the telephone call determining means 201 judges that the mobile phone terminal is in the telephone call mode, the approach detecting means 202 outputs infrared light and detects approaching of an object through detecting reflection of the infrared light which the approach detecting means 202 outputs.

In the case that the approach detecting means 202 detects approaching of the object, the input controlling means 203 carries out a control for making an input which is inputted from the touch panel unit 104 ineffective. In other words, even if the mobile phone terminal is in the state of telephone call, a function of the touch panel unit 104 is available under the condition that the approach detecting means 202 does not detect approaching of the object.

With the configuration which is shown in FIG. 1, it is possible to avoid a wrong operation of the mobile phone terminal due to the unconscious touch with the touch panel during the telephone call, without restricting the function which is available during the telephone call. User of the mobile phone terminal may want to carry out handling for inputting information during the telephone call. In the case, it is impossible to carry out the handling for inputting information if the function of the touch panel unit 104 is made ineffective uniformly during the telephone call. On the other hand, according to the configuration shown in FIG. 1, handling of the touch panel unit 104 can be made ineffective basically during the telephone call, and furthermore, it is possible to carry out handling for inputting information by use of the touch panel unit 104 if necessary even during the telephone call.

Figure 2:
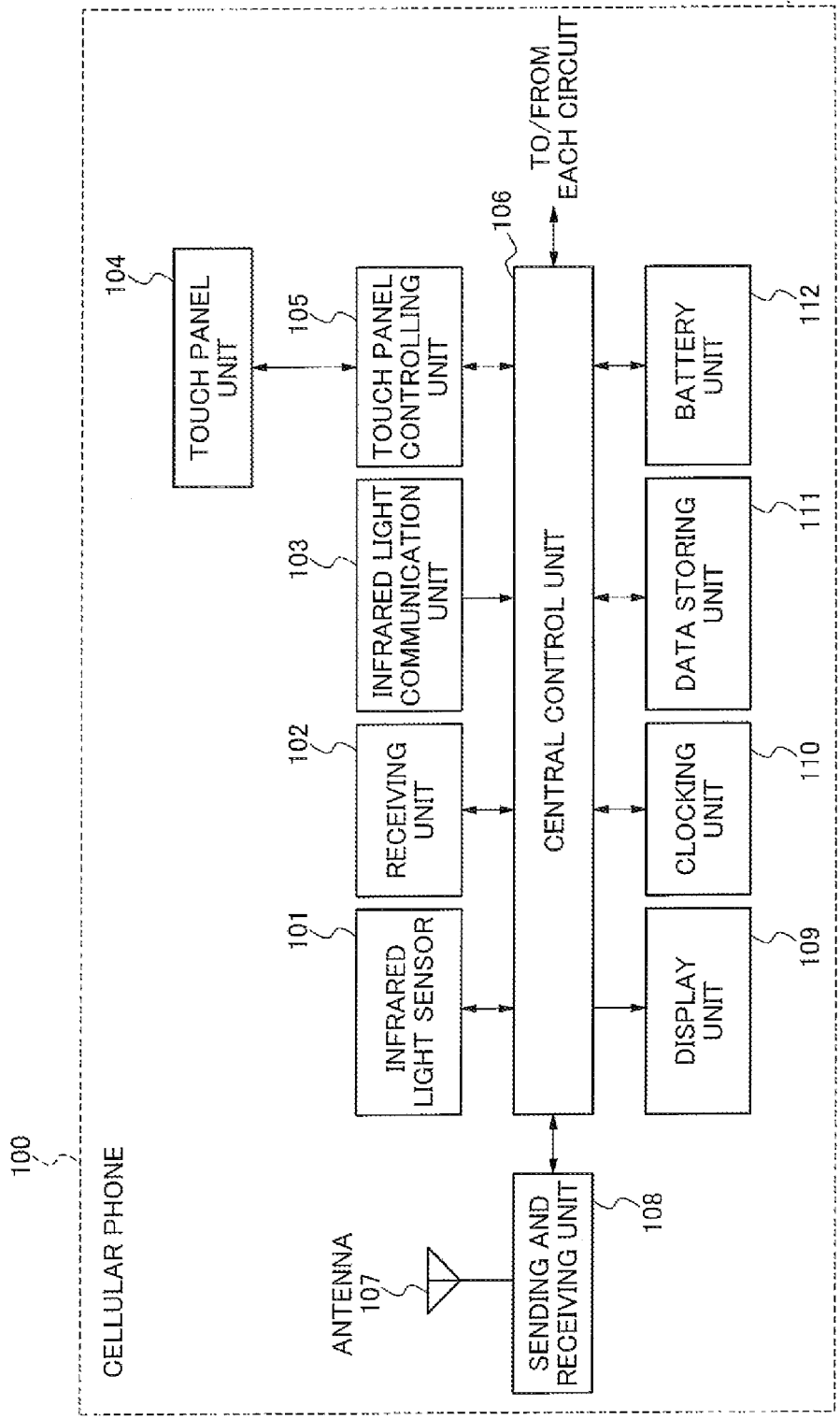
FIG. 2 is a block diagram showing an example of the configuration of the mobile phone terminal according to the first exemplary embodiment.

Hereinafter, the first exemplary embodiment of the present invention will be described with reference to a drawing. FIG. 2 is a block diagram showing an example of a configuration of the mobile phone terminal according to the first exemplary embodiment. A mobile telephone will be exemplified as the mobile phone terminal in the following description.

A mobile telephone 100 shown in FIG. 2 includes an infrared light sensor 101, a receiving unit 102, an infrared light communication unit 103, the touch panel unit 104 and a touch panel controlling unit 105. Furthermore, the mobile telephone 100 includes a central control unit 106, an antenna 107, a sending and receiving unit 108, a display unit 109, a clocking unit 110, a data storing unit 111 and a battery unit 112.

The infrared light sensor 101 outputs infrared light and detects approaching of the object through detecting reflection of the outputted infrared light. The infrared light sensor 101 is arranged near the receiving unit 102.

The receiving unit 102 outputs a voice (received voice) during the telephone call.

The infrared light communication unit 103 sends and receives data stored in the data storing unit 111 by use of infrared light.

The touch panel unit 104 is an inputting device which displays a function key such as a determination key and a mark and generates a signal corresponding to a selected key out of the displayed keys, and output the signal to the touch panel controlling unit 105 and the central control unit 106.

The touch panel controlling unit 105 controls an operation of the touch panel unit 104 when the touch panel controlling unit 105 receives an instruction which is for making the function of the touch panel unit 104 effective from the central control unit 106.

The central control unit 106 controls each of units of the mobile telephone 100 on the basis of a program. The central control unit 106 controls each of units intensively in reply to the signal which the touch panel unit 104 outputs on the basis of handling of the key.

The antenna 107 is for carrying out an effective radio transmission of the mobile telephone 100. The antenna 107 may be arranged inside the mobile telephone 100 and may be an expandable type.

The sending and receiving unit 108 demodulates a signal which is received from a radio base station via the antenna 107 and outputs the demodulated signal to the central control unit 106. Moreover, the sending and receiving unit 108 modulates a signal which the central control unit 106 outputs and converts the modulated signal to a signal of a radio frequency band and then, sends the converted signal to the radio base station via the antenna 107.

The display unit 109 displays image data, telephone number, text data or the like, which the data storing unit 111 stores, in reply to a display instruction outputted from the central control unit 106.

The data storing unit 111 stores telephone number, name or title of the telephone call destination, text data such as character, image data, measured data or the like. The clocking unit 110 has a function of clocking. The battery unit 112 is a secondary battery which can be charged and can supply electric power to the mobile telephone 100.

Figure 3:
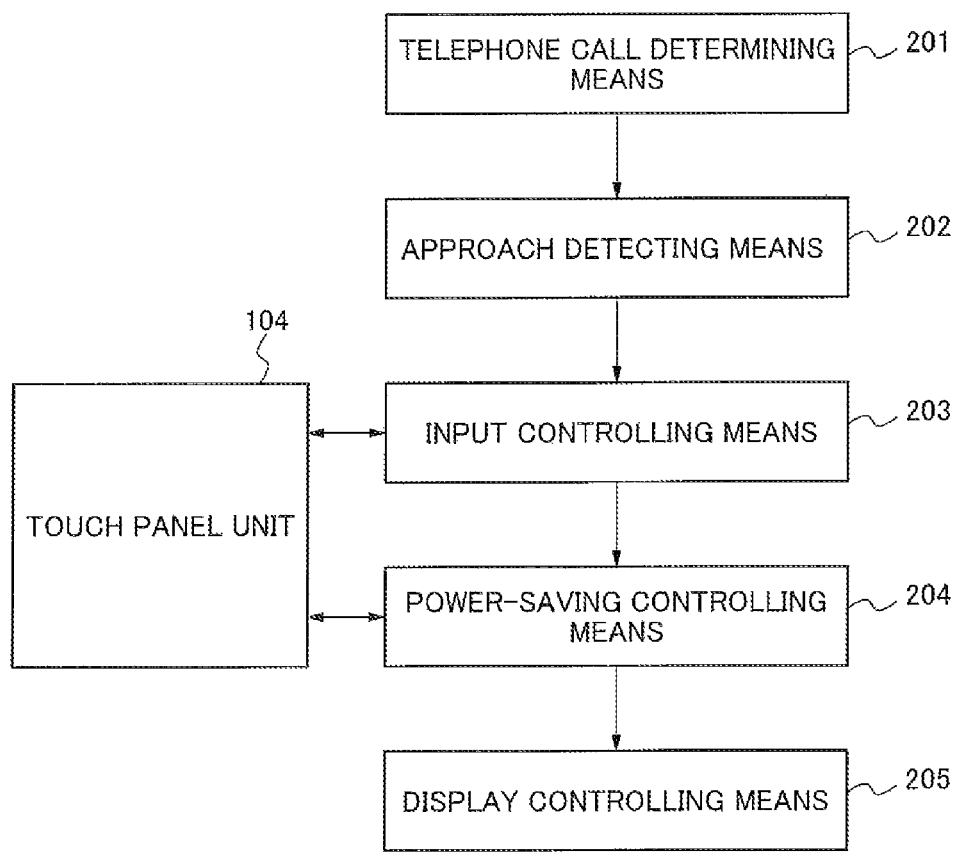
FIG. 3 is a block diagram showing a configuration for controlling the mobile phone terminal of the first exemplary embodiment.

FIG. 3 is a functional block diagram showing an example of a configuration of the mobile telephone according to the first exemplary embodiment. The mobile telephone 100 shown in FIG. 3 includes the touch panel unit 104, the telephone call determining means 201, the approach detecting means 202, the input controlling means 203, a power-saving controlling means 204 and a display controlling means 205. Further, a component in FIG. 3 which is the same as a component in FIG. 1 has the same code in FIG. 3 as the component in FIG. 1 has.

The telephone call determining means 201 and the display controlling unit 205 can be realized as a program for making the central control unit 106 carry out a function which will be described later. While a description like "The telephone call determining means 201 carries out" will be used in the following, the central control unit 106 carries out the processing actually on the basis of a program.

The input controlling means 203 and the power-saving controlling means 204 can be realize as a program for making the touch panel controlling unit 105 carry out a function which will be described later. While a description like "The input controlling means 203 carries out" will be used in the following, the touch panel controlling unit 105 carries out the processing actually on the basis of a program.

The telephone call determining means 201 judges existence of the telephone call mode. That is, the telephone call determining means 201 judges whether the mobile telephone 100 is in the telephone call mode (during telephone call). The telephone call determining means 201 is realized, for example, by executing of the central control unit 106.

The approach detecting means 202 detects approaching of the object. The approach detecting means 202 outputs infrared light and detects approaching of the object through detecting reflection of the outputted infrared light. The approach detecting means 202 is realized, for example, by use of the infrared light sensor 101.

The input controlling means 203 carries out the control to make the input from the touch panel unit 104 ineffective when the approach detecting means 202 have detected approaching of the object. Specifically, the input controlling means 203 carries out, for example, the control to make the input signal which the touch panel unit 104 generates ineffective.

On the other hand, in the case that the approach detecting means 202 does not detect approaching of any object, the input controlling means 203 carries out a control to make the input from the touch panel unit 104 effective. Specifically, the input controlling means 203 carries out, for example, the control to make the input signal which the touch panel unit 104 generates effective. The input controlling means 203 is realized, for example, by use of the touch panel controlling unit 105.

The power-saving controlling means 204 controls supply of electric power to the touch panel unit 104 to carry out a power-saving control. On the basis of the judgment whether the approach detecting means 202 detects approaching of object, the power-saving controlling means 204 carries out a control to increase or to decrease electric power supplied to the touch panel unit 104 to a predetermined value.

For example, in the case that the approach detecting means 202 detects approaching of the object, the power-saving controlling means 204 carries out, for example, a control to decrease electric power supplied to the touch panel unit 104 to the predetermined value as the power-saving control.

On the other hand, in the case that the approach detecting means 202 does not detect approaching of the object, the power-saving controlling means 204 stops the power-saving control and carries out, for example, a control to increase electric power supplied to the touch panel unit 104 to the predetermined value. The power-saving control means 204 is realized by use of the touch panel controlling unit 105.

The display controlling means 205 controls supply of electric power to the display unit 109 and carries out a display control. On the basis of the judgment whether the approach detecting means 202 detects approaching of the object, the display controlling unit 205 carries out a control to increase or to decrease electric power which is supplied to the display unit 109 to a predetermined value.

For example, in the case that the approach detecting means 202 detects approaching of the object, the display controlling means 205 carries out a control to decrease electric power which is supplied to the display unit 109 to the predetermined value as the power-saving control. For example, it may be preferable that the display controlling means 205 carries out a control not to supply electric power to the display unit 109.

Moreover, in the case that the approach detecting means 202 does not detect approaching of the object, the display controlling unit 205 carries out a control to release the power-saving control and to increase electric power which is supplied to the display unit 109 to the predetermined value. The display controlling unit 205 is realized by executing of the central control unit 106.

Figure 4:
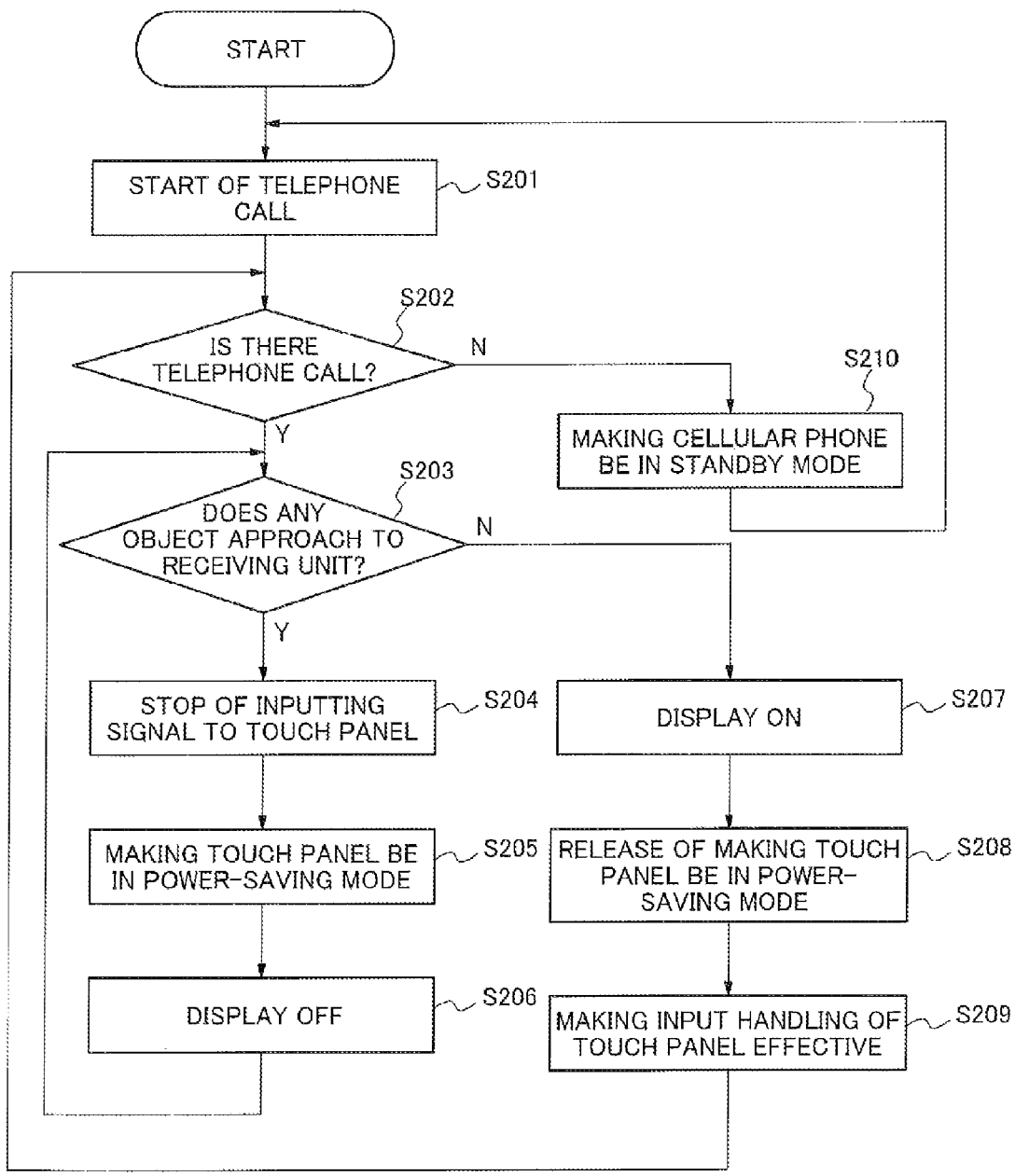
FIG. 4 is a flowchart showing an example of an operation of the mobile phone terminal according to the first exemplary embodiment.

Next, an operation of the first exemplary embodiment will be described with reference to a drawing. FIG. 4 is a flowchart showing an operation of the mobile phone terminal according to the first exemplary embodiment.

When user wants to start the telephone call, with the control of the central control unit 106, the sending and receiving unit 108 receives a signal from the radio base station via the antenna 107 and demodulates the received signal. Moreover, the sending and receiving unit 108 modulates a signal which the central control unit 106 outputs, and sends the modulated signal to the radio base station via the antenna 107 and starts the telephone call. The central control unit 106 sets the mobile telephone 100 to the telephone call mode (Step S201).

Next, the central control unit 106 judges existence of the telephone call mode (Step S202). In the case that the telephone call mode is judged to be continuing (Y), the processing shifts to Step S203. On the other hand, in the case that the telephone call mode is judged to be released (N), that is, in the case that the mobile telephone is judged not to be in the telephone call mode, the mobile telephone shifts to a standby mode (Step S210) and waits for starting of a telephone call. The processing shifts to Step S201 when the telephone call starts.

In Step S203, the infrared light sensor 101 detects approaching of the object. Since the infrared light sensor 101 is arranged near the receiving unit 102, the infrared light sensor 101 can detect approaching of the object to the receiving unit 102. The infrared light sensor 101 outputs infrared light and detects approaching of the object through detecting reflection of the outputted infrared light.

In the case that the infrared light sensor 101 detects approaching of the object to the receiving unit 102 (Y) in Step S203, the touch panel controlling unit 105 carries out the control to make the input which is inputted from the touch panel unit 104 ineffective. For example, the touch panel controlling unit 105 prohibits automatically the touch panel unit 104 from inputting information through carrying out the control to make the input signal which the touch panel unit 104 generates ineffective.

Next, the touch panel controlling unit 105 carries out the power-saving control of the touch panel unit 104 (Step S205). As the power-saving control, the touch panel controlling unit 105 carries out the control to decrease electric power supplied to the touch panel unit 104 to the predetermined value.

The central control unit 106 turns off a display on the display unit 109 (Step S206), and makes the processing shift to Step S203. In Step S206, the central control unit 106 carries out the control, for example, to stop supplying of electric power to the display unit 109 and to make the display off.

In the case that approaching of the object to the receiving unit 102 is detected in Step S203, the processing of steps S204, S205 and S206 are carried out repeatedly, and respective states are maintained.

On the other hand, in the case that approaching of the object to the receiving unit 102 is not detected (N), the central control unit 106 turns on the display on the display unit 109 (Step S207). For example, the central control unit 106 carries out a control to start supplying of electric power to the display unit 109 and to make the display ON.

The touch panel controlling unit 105 stops the power-saving control of the touch panel unit 104 (Step S208). For example, the touch panel controlling unit 105 carries out the control to increase an amount of electric power supply to the touch panel unit 104.

The touch panel controlling unit 105 carries out the control so as to start to handle the touch panel unit 104 for inputting information (Step S209). For example, the touch panel controlling unit 105 carries out the control to make the signal generated by the touch panel unit 104 effective.

According to the first exemplary embodiment, as described above, since the infrared light sensor unit detects approaching of the object in synchronization with starting of the telephone call, it is possible to detect easily that user has a posture to start the telephone call and consequently, it is possible to prevent the wrong operation of the mobile phone terminal due to the unconscious touch with the touch panel unit.

Moreover, according to the first exemplary embodiment, it is possible to obtain an effect which the invention disclosed in patent document 1 does not have. That is, since the control to save electric power of the touch panel unit and the control to turns off the display of the display unit are carried out, it is possible to suppress consumption of electric power.

According to the first exemplary embodiment, since the infrared light sensor unit is used for checking existence of the object nearby by use of infrared light, it is possible to detect approaching of the object even when ear of user or the like does not touch with the mobile phone terminal. Therefore, the first exemplary embodiment has an effect that it is possible to extend an effective range in which the telephone call mode is detected.

Further, it may be preferable that an infrared light communication unit used normally in the usual terminal for communication is applied to the infrared light sensor. If the infrared light communication unit has a configuration in which the infrared light communication unit is unified as a component with an extended function to detect approaching of the object, it is possible to realize the infrared light communication unit easily with no additional component.

It is possible to make the detection less influenced from the outside through employing the infrared light sensor as the sensor which carries out detection of approaching of the object.

Further, while it is exemplified that the control to decrease electric power supplied to the touch panel unit 104 and the display unit 109 to the predetermined value is carried out when the approach detecting means 202 detects approaching of the object according to the first exemplary embodiment mentioned above, it may be preferable to carry out a control to decrease an amount of electric power supply to other function which is not used for the telephone call.

Moreover, it may be preferable that the infrared light sensor 101 detects approaching of the object during the telephone call not always but several times a second. Furthermore, it is sufficient for the infrared light sensor 101 to have sensitivity that a distance, within which approaching of the object can be detected, is about several centimeters. Then, it may be preferable that the infrared light sensor 101 has a configuration in which high level output is not required.

Further, in the first exemplary embodiment mentioned above, the mobile phone terminal, which has a characteristic configuration as the following (1) to (6), is described.

(1) The mobile phone terminal characterized by comprising the touch panel unit for inputting information (for example, the touch panel unit is realized through the touch panel unit 104), the telephone call determining means which judges whether the mobile phone terminal is in the telephone call mode (for example, the telephone call determining means is realized through the telephone call determining means 201, i.e. the central control unit 106), the approach detecting means which outputs infrared light and detects reflection of the outputted infrared light to detect approaching of the object (for example, the approach detecting means is realized through the approach detecting means 202, i.e. the infrared light sensor 101), and the input controlling means (for example, the input control means is realized through the input controlling means 203, i.e. the touch panel controlling unit 105) which carries out the control to make the inputted information from the touch panel unit ineffective in the case that the approach detecting means judges that the mobile phone terminal is in the telephone call mode.

(2) The mobile phone terminal including the power-saving controlling means (for example, the power-saving controlling means is realized through the power-saving controlling means 204, i.e. the touch panel controlling unit 105) which carries out the control to decrease or to increase electric power supplied to the touch panel unit to the predetermined value on the basis of the judgment whether the approach detecting means detects approaching of the object. The mobile phone terminal which has the configuration mentioned above can reduce the power consumption thereof and prevent the temperature rise thereof.

(3) According to the mobile phone terminal including the power-saving controlling means, the power-saving controlling means carries out the control to decrease electric power supplied to the touch panel unit to the predetermined value in the case that the approach detecting means detects approaching of the object. The mobile phone terminal which has the configuration mentioned above can reduce the power consumption thereof and prevent the temperature rise thereof.

(4) The mobile phone terminal including the display unit (for example, the display unit is realized through the display unit 109) which displays information, and the display controlling means (for example, the display controlling means is realized through the display controlling means 205, i.e. the central control unit 106) which carries out the control to decrease or to increase electric power supplied to the display unit to the predetermined value on the basis of the judgment whether the approach detecting means detects approaching of the object. The mobile phone terminal which has the configuration mentioned above can reduce furthermore the power consumption thereof and prevent the temperature rise thereof.

(5) According to the mobile phone terminal including the display controlling means, the display controlling means carries out the control to decrease electric power supplied to the display unit to the predetermined value in the case that the approach detecting means detects approaching of the object. The mobile phone terminal which has the configuration mentioned above can reduce the power consumption thereof furthermore and prevent the temperature rise thereof.

(6) According to the mobile phone terminal including the approach detecting means, the approach detecting means is arranged near the receiving unit thereof. The mobile phone terminal which has the configuration mentioned above can detect that a part of user's body approaches thereto during the telephone call.

A mobile phone terminal will be described in the following according to a second exemplary embodiment of the present invention.

Figure 5:
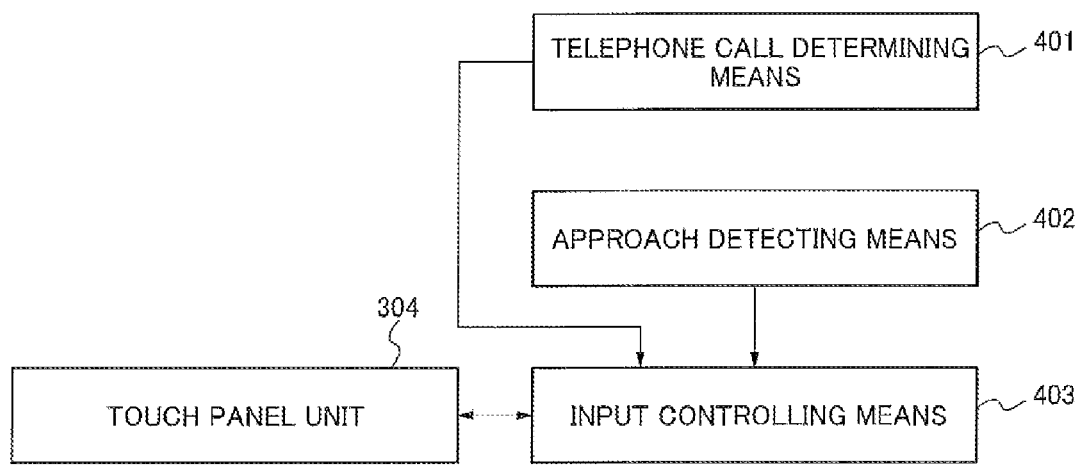
FIG. 5 is a block diagram showing an outline of a configuration of a mobile phone terminal according to a second exemplary embodiment of the present invention.

First, an outline of the mobile phone terminal will be described according to the second exemplary embodiment. According to the second exemplary embodiment, as shown in FIG. 5, the mobile phone terminal includes a touch panel unit 304, a telephone call determining means (telephone call determining unit) 401, an approach detecting means (approach detecting unit) 402 and an input controlling means (input controlling unit) 403.

The touch panel unit 304 is an input means for inputting information. The telephone call determining means 401 judges whether the mobile phone terminal is in the telephone call mode. The approach detecting means 402 outputs a predetermined wave and detects receiving of the predetermined wave as approaching of the object. There are plural kinds of waves such as infrared light, supersonic or the like. The wave applied herein is selected suitably out of the plural kinds of waves which reflect from an object (mainly, human body). Thus, when the object (human body) approaches to the mobile phone terminal, the predetermined wave outputted reflects from the approaching object to return to the mobile phone terminal. It is possible to detect approaching of the object through detecting the returned wave.

In the case that the telephone call determining means 401 judges that the mobile phone terminal is in the telephone call mode and the approach detecting means 202 detects approaching of the object, the input controlling means 403 carries out a control to make inputted information from the touch panel part 304 ineffective. In other words, even if the mobile phone terminal is in the telephone call mode, a function of the touch panel unit 304 is effective under the condition that the approach detecting means 402 does not detect approaching of the object.

The mobile phone terminal which has the aforementioned configuration carries out an operation described in the following. That is, the telephone call determining means 401 judges whether the mobile phone terminal is in the telephone call mode. When the approach detecting means 402 outputs infrared light and detects reflection of the outputted infrared light, the approach detecting means 402 detects approaching of the object on the basis of detecting the reflection. In the case that the telephone call determining means 401 judges that the mobile phone terminal is in the telephone call mode and the approach detecting means 402 detects approaching of the object, the input controlling means 403 carries out the control to make the inputted information from the touch panel part 304 ineffective.

Since the mobile phone terminal operates as mentioned above according to the configuration shown in FIG. 5, it is possible to avoid the wrong operation of the mobile phone terminal due to the unconscious touch with the touch panel during the telephone call, without restricting the function which is available during the telephone call.

Figure 6:
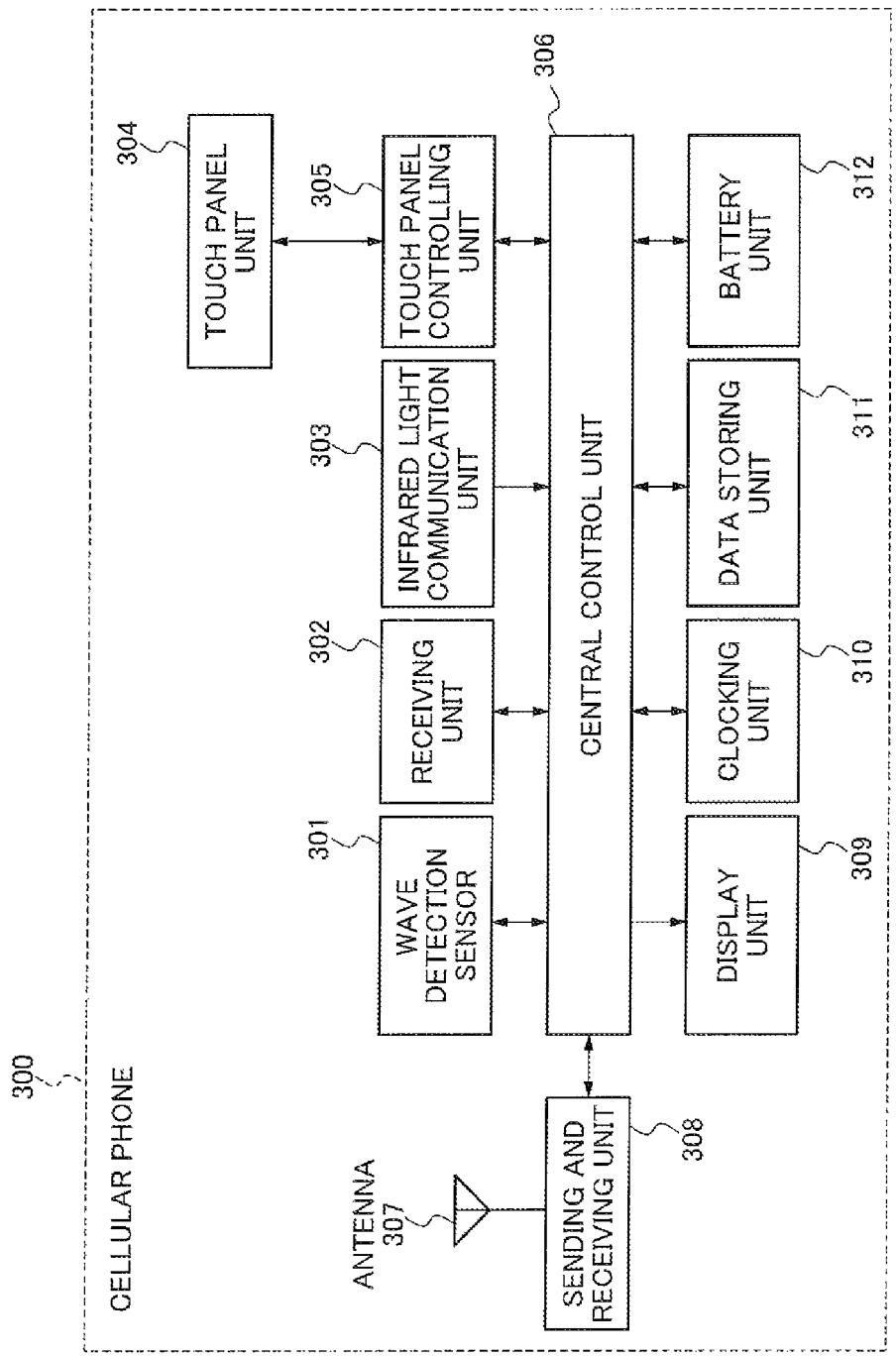
FIG. 6 is a block diagram showing an example of the configuration of the mobile phone terminal according to the second exemplary embodiment.

FIG. 6 is a block diagram showing an example of the configuration of the mobile phone terminal according to the second exemplary embodiment. A mobile telephone is applied to the mobile phone terminal according to the second exemplary embodiment. According to the second exemplary embodiment, the mobile telephone 300 includes a wave detecting sensor 301, a receiving unit 302, an infrared light communication unit 303, the touch panel unit 304, a touch panel controlling unit 305 and a central control unit 306. Furthermore, the mobile telephone 300 includes an antenna 307, a sending and receiving unit 308, a display unit 309, a clocking unit 310, a data storing unit 311 and a battery unit 312.

The wave detecting sensor 301 outputs a predetermined wave (wave such as infrared light, supersonic or the like) and detects receiving of the wave as approaching of the object. An infrared light sensor, a supersonic sensor or the like can be exemplified as the wave detecting sensor 301.

The wave detecting sensor 301 is arranged near the receiving unit 302. Further, according to the second exemplary embodiment, it is sufficient to detect an object which approaches to the mobile telephone 300, for example, within several centimeters apart. For this reason, the wave detecting sensor 301 dose not need to output a strong wave.

The receiving unit 302 has a configuration in which a voice (receiving voice) received during the telephone call is outputted.

The infrared light communication unit 303 has a configuration for converting an electric signal corresponding to data stored in the data storing unit 311 into an infrared light signal and sending the infrared light signal. Furthermore, the infrared light communication unit 303 has a configuration for receiving the sending infrared light signal and converting the received infrared light signal into an electric signal.

The touch panel unit 304 is an apparatus for inputting information. For example, the touch panel unit 304 has a configuration for displaying a function key such as a determination key and a mark key. Moreover, the touch panel unit 304 has a configuration for generating a signal on the basis of a state of touch (that is, key handling) with a displayed part of the key and outputting the generated signal to the touch panel controlling unit 305 and the central control unit 306.

The touch panel controlling unit 305 controls the touch panel unit 304 in the case that the touch panel controlling unit 305 receives an instruction which is for making the function of the touch panel unit 304 effective from the central control unit 306.

The central control unit 306 has a configuration for controlling the operation of the mobile telephone 300 on the basis of the signal which the touch panel unit 304 generates according to for example user's handling of the touch panel unit 304 (key operation) and a program given in advance.

The antenna 307 is for carrying out radio communication of the mobile telephone 300. It may be preferable that the antenna 307 is accommodated in a case (not shown in the figure) of the mobile telephone 300 and it may be preferable that the antenna 307 is projected to the outside of the case. Moreover, it may be preferable that the antenna 307 is an expandable stick antenna and is made of a metal plate. In other word, shape or the like of the antenna 307 has no restriction in particular.

The sending and receiving unit 308 has a configuration for demodulating a signal received by the antenna 307 and outputting the demodulated signal to the central control unit 306. Furthermore, the sending and receiving unit 308 has a configuration for modulating a signal received from the central control unit 306 and outputting the modulated signal to the antenna 307. The modulated signal outputted to the antenna 307 is sent into the air from the antenna 307.

The display unit 309 includes, for example, a liquid crystal display. The display unit 309 displays data of the data storing unit 311 in accordance with a display instruction outputted from the central control unit 306.

The data storing unit 311 has a configuration for storing telephone number, name (title) of telephone call destination, text data such as character, image data, measured data or the like. The clocking unit 310 has a configuration for measuring time. The battery unit 312 is a secondary battery which can be charged. Electric power of the battery unit 312 is supplied to a part which requires electric power in the mobile telephone 300 such as the central control unit 306 or the like.

Figure 7:
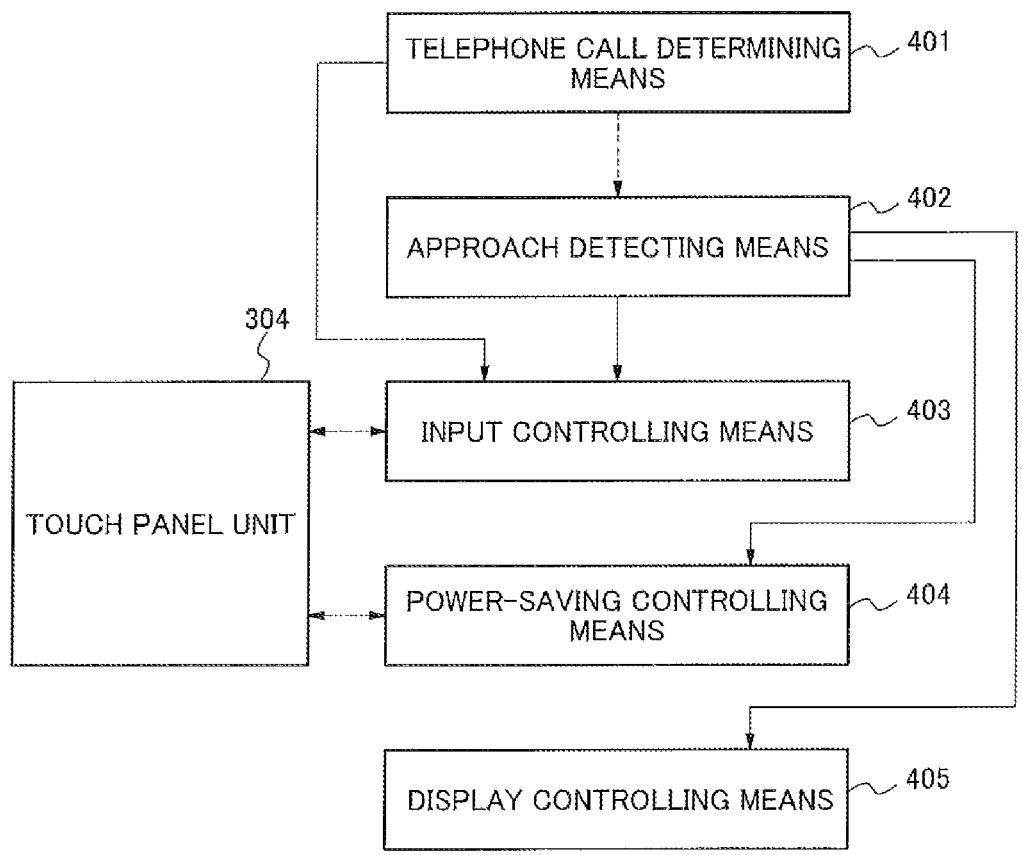
FIG. 7 is a block diagram showing a configuration for controlling the mobile phone terminal according to the second exemplary embodiment.

The mobile telephone 300 of the second exemplary embodiment has a configuration shown in FIG. 7 for carrying out a function described in the following on the basis of the aforementioned configuration. That is, the mobile telephone 300 includes the telephone call determining means 401, the approach detecting means 402, the input controlling means 403, a power-saving controlling means (power-saving controlling unit) 404 and a display controlling means (display controlling unit) 405.

The telephone call determining means 401 judges whether the mobile telephone 300 is in the telephone call mode (during telephone call). The telephone call determining means 401 is realized by executing of the central control unit 306 which is controlled by a program for realizing the above-mentioned judging procedure.

The approach detecting means 402 includes the wave detecting sensor 301. The approach detecting means 402 outputs a predetermined wave (for example, infrared light or supersonic) and detects receiving of the predetermined wave as approaching of the object by use of the wave detecting sensor 301.

In the case that the telephone call determining means 401 judges that the mobile phone terminal is in the telephone call mode and the approach detecting means 402 detects approaching of the object, the input controlling means 403 carries out the control to make inputted information from the touch panel part 404 ineffective. Specifically, the input controlling means 403 carries out the control to make the signal which the touch panel part 304 generates ineffective. Moreover, even if the telephone call determining means 401 judges that the mobile phone terminal is in the telephone call mode, the input controlling unit 403 carries out a control to make the inputted information from the touch panel unit 304 effective under the condition that the approach detecting means 402 does not detect approaching of the object. Specifically, the input controlling means 403 carries out the control, for example, to make the signal which the touch panel unit 304 generates effective. The input controlling means 403 mentioned above is realized by executing of the touch panel controlling unit 305 which is controlled by a program for carrying out the above-mentioned control procedure.

On the basis of the judgment whether the approach detecting means 402 detects approaching of the object, the power-saving controlling means 404 carries out a control to increase or to decrease an amount of electric power supplied to the touch panel unit 304. For example, in the case that the approach detecting means 402 detects approaching of the object, the power-saving controlling means 404 carries out a control to decrease the amount of electric power supplied to the touch panel unit 304 to a predetermined value for the power-saving control, as the power-saving control. On the other hand, in the case that the approach detecting means 402 does not detect approaching of the object, the power-saving controlling means 404 carries out a control to release the power-saving control and then, to increase (restore) the amount of electric power supplied to the touch panel unit 304 to the predetermined value. The power-saving controlling means 404 mentioned above is realized by executing of the touch panel controlling unit 305 which is controlled by a program for carrying out the above-mentioned control procedure.

On the basis of the judgment whether the approach detecting means 402 detects approaching of the object, the display controlling means 405 carries out a control to increase or to decrease the amount of electric power supplied to the display unit 309. For example, in the case that the approach detecting means 402 detects approaching of the object, the display controlling means 405 carries out a control to decrease the amount of electric power supplied to the display unit 309 to a predetermined value for the power-saving control, as the power-saving control. For example, it may be preferable that as the power-saving control, the display controlling means 405 carries out a control to stop supplying of electric power to the display unit 309. On the other hand, in the case that the approach detecting means 402 does not detect approaching of the object, the display controlling means 405 carries out a control to release the power-saving control and then, to increase (restore) the amount of electric power supplied to the display unit 309 to the predetermined value. The display controlling means 405 mentioned above is realized by executing of the central control unit 306 which is controlled by a program for carrying out the above-mentioned control procedure.

Figure 8:
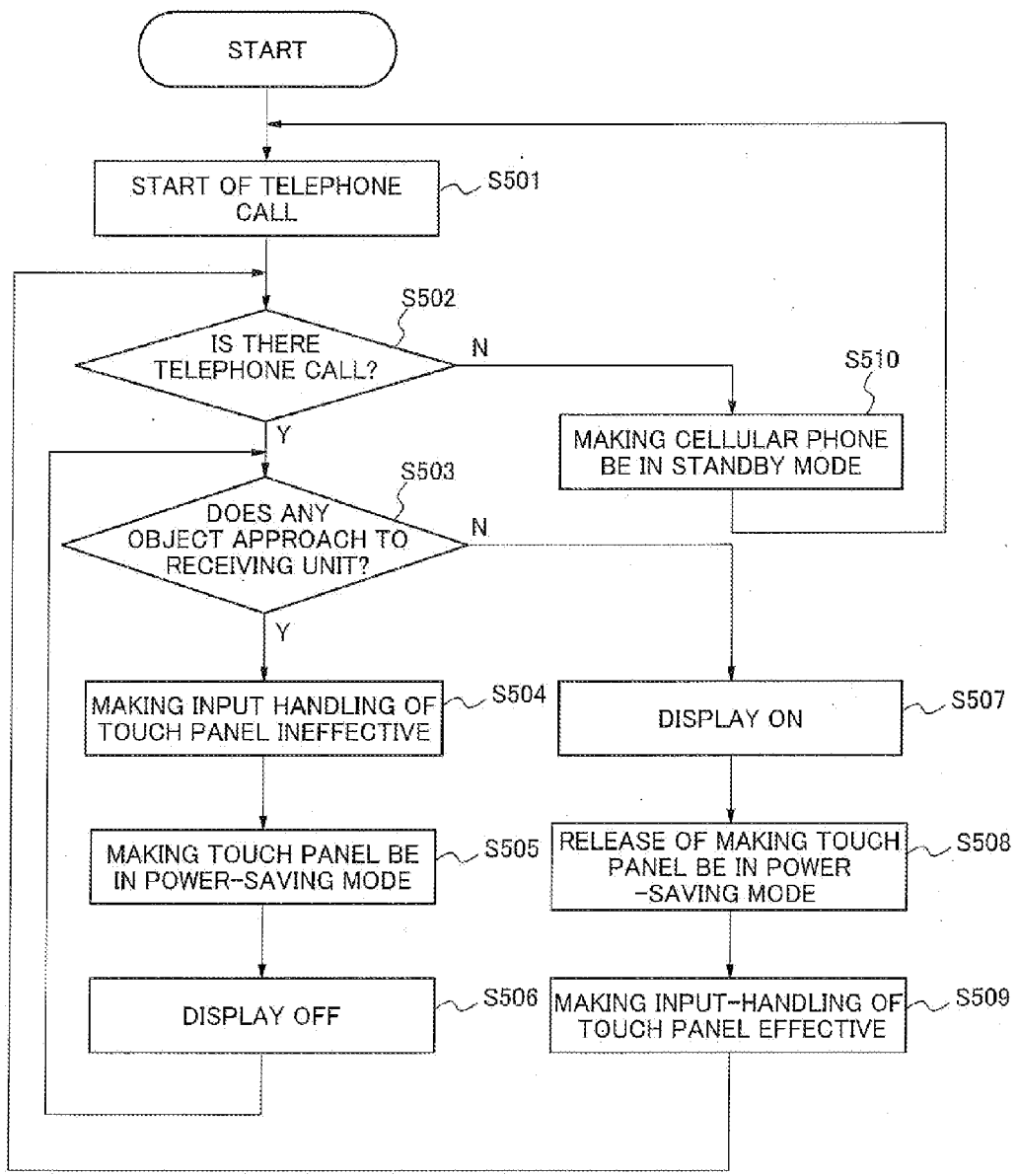
FIG. 8 is a flowchart showing an example of an operation of the mobile phone terminal according to the second exemplary embodiment.

Next, an example of an operation of the mobile telephone 300 will be described with reference to a flowchart in FIG. 8 according to the second exemplary embodiment.

In the case that the central control unit 306 detects that user handles the mobile telephone 300 in order to set up a telephone call, the central control unit 306 sets an operation mode of the mobile telephone 300 to the telephone call mode (Step S501).

Next, the central control unit 306 judges whether the telephone call mode continues (Step S502). In the case that it is judged that the telephone call mode continues, the procedure shifts to Step S503. In the case that it is judged that the telephone call is completed, that is, in the case that it is judged that the mobile telephone 300 is not in the telephone call mode, the central control unit 306 enters into the standby mode and waits for starting of a next telephone call (Step S510).

In Step S503, the central control unit 306 judges whether the approach detecting means 402 detects approaching of the object. That is, the central control unit 306 judges whether the wave detecting sensor 301 detects receiving of the wave.

According to the second exemplary embodiment, the wave detecting sensor 301 is arranged near the receiving unit 302. For this reason, it is judged in Step S503 whether the object approaches to the receiving unit 302.

In the case that the central control unit 306 judges that the object approaches to the receiving unit 302 in Step S503, the input controlling means 403, that is, the touch panel controlling unit 305 carries out the control to make information inputted from the touch panel unit 304 ineffective in Step S504. The touch panel controlling unit 305 carries out, for example, the control to make the signal which the touch panel unit 304 generates ineffective.

Next, the power-saving controlling means 404, that is, the touch panel controlling unit 305 carries out the power-saving control of the touch panel unit 304 (Step S505). As the power-saving control, the touch panel controlling unit 305 carries out, for example, the control to decreases the amount of electric power supplied to the touch panel unit 304 to the predetermined value for the power-saving control.

Afterward, the display controlling means 405, that is, the central control unit 306 decreases the amount of electric power supplied to the display unit 309 to the predetermined value for the power-saving control in Step S506. For example, the display controlling means 405 (central control unit 306) stops supplying electric power to the display unit 309. As a result, display on the display unit 309 is turned off. Afterward, steps after above-mentioned Step S503 are repeated.

On the other hand, in the case that it is judged that any object which approaches to the receiving unit 302 is not detected in Step S503 mentioned above, the display controlling means 405, that is, the central control unit 306 controls the amount of electric power supplied to the display unit 309 to the predetermined value in Step S507 in order to change display on the display unit 309 into ON state.

Next, in the case that the power-saving controlling means 404, that is, the touch panel controlling unit 305 carries out the power-saving of the touch panel unit 304, the power-saving controlling means 404 (touch panel controlling unit 305) releases the power-saving control of the touch panel unit 304 and carries out, for example, the control to increase (restore) the amount of electric power supplied to the touch panel unit 304 in Step S508.

Moreover, the input controlling means 403 (touch panel controlling unit 305) carries out the control to make the signal which the touch panel unit 304 generates effective, that is, the control to make the input which is inputted to the touch panel unit 304 effective in Step S509. Afterward, steps after above-mentioned Step S502 are repeated.

As described above, according to the second exemplary embodiment, the telephone call determining means 401 which judges whether the mobile telephone is in the telephone call mode, and the approach detecting means 402 which detects approaching of the object by use of the wave detection sensor 301 are provided. As a result, it is possible to detect correctly not only existence of the telephone call and not only existence of approach of the object to the mobile telephone 300 (receiving unit 302) but also being approaching of the object during the telephone call.

According to the second exemplary embodiment, the following configuration is adopted. That is, the input controlling unit 403 makes the information inputted from the touch panel unit 304 ineffective when the telephone call detecting means 401 detects that the mobile telephone 300 is in the telephone call mode and the approach detecting means 402 detects approaching of the object. As a result, it is possible to avoid the wrong operation of the mobile telephone 300 due to the unconscious touch with the touch panel. Moreover, according to the second exemplary embodiment, approaching of the object is detected by use of the wave detection sensor 301 and not by use of a camera which is arranged inside the mobile telephone, as mentioned above. For this reason, it is possible to detect approaching of the object without limiting a function which is available during the telephone call, such as a photography function.

Moreover, according to the second exemplary embodiment, the power-saving control means 404 is provided. That is, the power-saving control means 404 carries out the power-saving control to decrease the amount of electric power supplied to the touch panel unit 304 in the case that the approach detecting means 402 detects approaching of the object. In the case that the approach detecting means 402 detects approaching of the object, that is, in the case that the approach detecting means 402 detects approaching of the object to the receiving unit 302, it is assumed that the touch panel unit 304 is in an unavailable state due to an obstacle which is the approaching object. There is no problem even if the amount of electric power supplied to the touch panel unit 304 is decreased in the case. In other words, it is wasteful that electric power is supplied to the touch panel unit 304 though the touch panel unit 304 is in the unavailable state. Therefore, it is possible to avoid waste and to reduce power consumption through decreasing electric power supplied to the touch panel unit 304 in the case that the approach detecting means 402 detects approaching of the object.

Similarly, it is possible to avoid waste and to reduce power consumption through decreasing electric power supplied to the display unit 309 by use of the display controlling means 405 in the case that the approach detecting means 402 detects approaching of the object.

Furthermore, it is possible to reduce an amount of heat generated in the touch panel unit 304 and the display unit 309, because electric power supplied to the touch panel unit 304 and the display unit 309 decrease during the telephone call when the approach detecting means 302 detects approaching the object. As a result, it is possible to solve the problem that user of the mobile telephone feels uncomfortable due to the temperature rise of the mobile telephone 300 during the telephone call.

According to the second exemplary embodiment, the following configuration is provided. That is, handling of the touch panel unit 304 is made ineffective when the approach detecting means 402 detects approaching of the object during the telephone call, as mentioned above. In other words, in the case that the approach detecting means 402 does not detect approaching of the object even during the telephone call, handling of the touch panel unit 304 is effective. That is, for example, user of the mobile telephone may want to handle the touch panel unit 304 for inputting information in some cases, when it is possible to handle the touch panel unit 304 in a so-called on-hook telephone call mode in which it is possible to telephone without making ear approach to the receiving unit 302. In the case, if handling of the touch panel unit 304 is made ineffective uniformly during the telephone call, there is a prospect that user feels dissatisfied since it is impossible to handle the touch panel unit 304 for inputting information. In contrast, according to the configuration of the second exemplary embodiment, the following configuration is provided. That is, in the case that the approach detecting means 402 does not detect approaching of the object, that is, in the case that it is assumed that user can handle the touch panel unit 304, it is possible to handle the touch panel unit 304 for inputting information. As a result, it is possible to prevent user from feeling the above-mentioned dissatisfaction.

Further, the present invention is not limited to the first and the second exemplary embodiments, and can adopt the various embodiments. For example, according to the first and the second embodiments, in the case that the approach detecting means 202 and 402 detect approaching of the object, the power-saving control for decreasing electric power, which is supplied to the touch panel units 104 and 304 and the display units 109 and 309, is carried out. In contrast, it may be preferable that the power-saving control to decrease an amount of electric power supply of a component, which has no necessity to the telephone call, is carried out during the telephone call.

Furthermore, it may be preferable that the approach detecting means 202 and 402 detect approaching of the object not continuously but at a predetermined interval of time like, for example, several times a second.

Moreover, according to the first and the second exemplary embodiments, while the power-saving controlling means 204 and 404 and the display controlling means 205 and 405 are provided, the power-saving control means 204 and 404 and the display controlling means 205 and 405 should be provided respectively according to the necessity. Then, it may be preferable to omit them, if they are unnecessary.

Moreover, it may be preferable that the approach detecting means 402 has a configuration in which approaching of the object is detected only if the call determining means 401 judges that the mobile telephone is in the telephone call mode. In this case, whenever the approach detecting means 402 detects approaching of the object, the mobile telephone is always in the telephone call mode. As a result, the input controlling means 403 can detect that the telephone call determining means 401 judges that the mobile telephone is in the telephone call mode, and can detect that the approach detecting means 402 detects approaching of the object, without direct receiving of judgment result of the telephone call determining means 401 and on the basis of only detection result of the approach detecting means 402.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be applied effectively to a mobile telephone which is equipped with a touch panel.

The invention claimed is:

1. A mobile phone, comprising:
   a touch panel;
   a sensor configured to receive a reflection of outputted infrared light, the sensor being activated in response to the mobile phone being in a telephone call mode; and
   a controller configured to deactivate a touch function of the touch panel in response to the sensor receiving the reflection of the outputted infrared light.

2. The mobile phone according to claim 1, further comprising
   an output device configured to output the infrared light.

3. The mobile phone according to claim 1, wherein the controller is further configured to reactivate the touch function of the touch panel in response to the sensor not receiving the reflection of the outputted infrared light after the controller had deactivated the touch function of the touch panel.

4. The mobile phone according to claim 1, wherein the controller is further configured to an amount of electric power supplied to the touch panel to increase or decrease in response to the sensor receiving the reflection of the outputted infrared light.

5. The mobile phone according to claim 4, wherein the controller is further configured to control the amount of electric power supplied to the touch panel to decrease to a predetermined value in response to the sensor receiving the reflection of the outputted infrared light.

6. The mobile phone according to claim 1, further comprising:
   a display configured to display information,
   wherein the controller is further configured to an amount of electric power supplied to the display to increase or decrease in response to the sensor receiving the reflection of the outputted infrared light.

7. The mobile phone according to claim 6, wherein the controller is further configured to control the amount of electric power supplied to the display to decrease to a predetermined value in response to the sensor receiving the reflection of the outputted infrared light.

8. A method for controlling a function of a touch panel of mobile phone, the method comprising:
   receiving, by a sensor, a reflection of outputted infrared light when the mobile phone is in a telephone call mode, the sensor being activated in response to the mobile phone being in a telephone call mode; and
   making the function of the touch panel ineffective in case that receiving the reflection of infrared light when the mobile hone is in a telephone call mode.

* * * * *